United States Patent Office 3,794,690
Patented Feb. 26, 1974

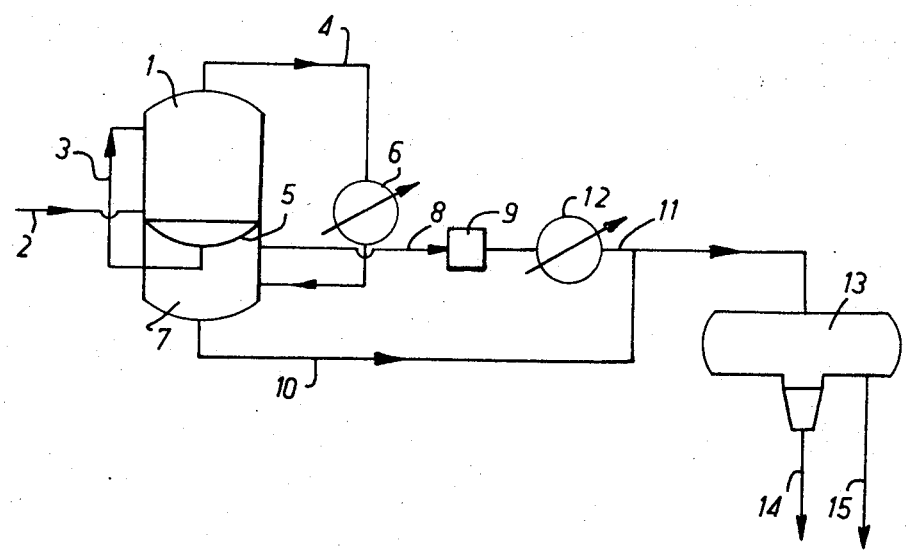

3,794,690
METHOD FOR THE RECOVERY OF ISOBUTYLENE
Willem A. Steggerda, Leiderdorp, Netherlands, assignor to Compagnie Francaise de Raffinage, Paris, France
Filed June 14, 1972, Ser. No. 262,791
Claims priority, application France, June 18, 1971, 7122304
Int. Cl. C07c 11/00
U.S. Cl. 260—677 A 2 Claims

ABSTRACT OF THE DISCLOSURE

A method for total recovery of isobutylene, particularly useful in the "weak" (50%) $H_2SO_4$ extraction process, from a mixed $C_4$ stream of cracked petroleum gases where the efflux from the acid regenerator comprises isobutylene, tertiary butyl alcohol, lower isobutylene polymers, water and $H_2SO_4$ comprising treating the efflux in a caustic soda scrubbing tower to remove $H_2SO_4$, liquefying the vapors (preferably by first partially condensing the vapors with flash distillation to give residual vapors containing about 99% of the total isobutylene and then compressing and condensing the residual vapors), settling the resulting liquid, separating the resulting aqueous phase and the organic phase (which latter contains all the isobutylene) and concentrating the isobutylene by known means.

IMPROVED METHOD FOR THE RECOVERY OF ISOBUTYLENE

The present invention relates to the recovery of all the isobutylene contained in a charge of isobutylene contaminated by impurities. More particularly it relates to a method of treating an efflux coming from an isobutylene regenerating tower in an isobutylene extraction process.

It is known that isobutylene can be selectively extracted from a mixture of hydrocarbons comprising four tion agent is sulfuric acid of a concentration close to that of isobutylene. The assignee, Compagnie Francaise de Raffinage, has developed a process in which the extraction agent is sulfuric acid of a concentration of close to 50%. See Chemical Engineering News for Mar. 29, 1965 at pages 66–68. This process provides the great advantage of permitting the extraction and regeneration of the isobutylene with an acid of constant concentration and thus avoids successive dilutions and reconcentrations of the sulfuric acid.

The efflux which comes from the regeneration of the isobutylene is formed primarily of isobutylene, but it also contains tertiary butyl alcohol and, in smaller quantities, isobutylene polymers, water, and sulfuric acid. The tertiary butyl alcohol comes from incomplete regeneration of isobutylene. The isobutylene polymers consist primarily of lower polymers, namely dimers and trimers. The presence of traces of sulfuric acid is due to entrainment by gaseous isobutylene of some of the acid which served in the regeneration of the isobutylene.

The prior method of treating the efflux consist in introducing it into a caustic soda scrubbing tower so as to eliminate traces of sulfuric acid and then, by flash distillation, separating the isobutylene on the one hand and a mixture of tertiary butyl alcohol, lower isobutylene polymers, and water, on the other hand. The isobutylene is introduced into a compressor and is then purified. The polymers are separated from the tertiary butyl alcohol by washing with water.

An object of the present invention is to improve the yield of regenerated isobutylene after extraction with sulfuric acid of a concentration of close to 50%.

Precise analyses have shown that the mixture of tertiary butyl alcohol, polymers and water separated from the isobutylene in the flash distillation contains dissolved isobutylene in an amount of the order of 10% by weight of said mixture and of the order of 1% by weight of the total isobutylene.

The present invention concerns means for recovering that quantity of isobutylene which, if no particular precaution is taken, is eliminated together with the polymers.

The present invention teaches a method of recovering the total amount of isobutylene contained in vapor form in a charge which contains, in addition to the isobutylene, also tertiary butyl alcohol, polymers of isobutylene, sulfuric acid and water. The said process comprises removing the sulfuric acid by washing the charge with an alkaline solution, liquefying the vapors which have been freed of sulfuric acid, separating—by settling of the liquid—an aqueous phase containing tertiary butyl alcohol from an organic phase containing all the isobutylene and the isobutylene polymers, and then concentrating the isobutylene by known means.

Another aspect of the invention comprises the application of the process which has just been described to the treatment of a charge which primarily contains isobutylene and comes from the regeneration of isobutylene in a process for the extraction of isobutylene by a solution of sulfuric acid of a concentration of close to 50%, said application being characterized by the fact that the tertiary butyl alcohol collected by settling is recycled into the isobutylene regenerating apparatus.

The process of the invention can be carried out, in general, on isobutylene vapors laden with tertiary butyl alcohol, isobutylene polymers, sulfuric acid, and water. The scrubbing of this initial mixture by an alkaline solution can be effected by any known means. It is necessary to assure good contact between the vapors which are to be freed of the sulfuric acid and the alkaline solution. An aqueous solution of caustic soda can be used.

The alkaline solution is generally recycled; however, it becomes enriched in sulfate and therefore requires replacement after a certain period of use. The sulfate formed is eliminated with the alkaline solution.

From the vapors, freed of the sulfuric acid which they contained, an aqueous phase and an organic phase must be extracted. One simple method consists in effecting this separation of phases in liquid state. It is therefore necessary to condense all of the vapors.

The complete condensation of the vapors can be effected in two stages:

In a first stage a partial condensation of the vapors is effected by passing them into a condenser and then separating, for instance by flash distillation, the residual vapors from a liquid phase.

The residual vapors obtained at the outlet of the first stage are formed of isobutylene saturated with tertiary butyl alcohol, polymers, and water. The liquid phase is formed of tertiary butyl alcohol, polymers, isobutylene, dissolved isobutylene and water.

In a second stage the residual vapors are condensed after their compression.

The liquid phases obtained at the end of the first and second stages are mixed together. The aqueous phase is separated by settling from the organic phase. The aqueous phase contains tertiary butyl alcohol dissolved in water. The organic phase contains isobutylene, tertiary butyl alcohol, and the polymers of isobutylene. A further purification, for instance by distillation, makes it possible to separate the concentrated isobutylene.

One particular application of the process of the invention consists in employing it on a charge of crude isobutylene coming from the regeneration of isobutylene after selective extraction thereof by means of sulfuric acid of a concentration of close to 50%.

Such a charge of isobutylene has, for instance, the following composition, expressed in parts by weight

| | |
|---|---|
| Isobutylene | 100 |
| Tertiary butyl alcohol | 22 |
| Polymers (primarily dimers and trimers) | 5 |
| Sulfuric acid | (1) |
| Water | (1) |

[1] For memorandum only.

The single figure accompanying the specification is a simplified diagram, given by way of illustration and not of limitation, showing an application as an embodiment of the inventive process mentioned above.

A charge similar to the one whose composition is indicated above is introduced into a caustic soda scrubbing apparatus 1 via the line 2. The aqueous caustic soda solution is recycled through the line 3. The vapors escape through the line 4, while the liquid is collected at 5.

A condenser 6 which is traversed by cold water partially condenses the vapors. A flash distillation in the enclosure 7 separates the isobutylene vapors (which are conducted through the line 8 towards the compressor 9) from a liquid phase (which is recovered via the line 10). This liquid phase is mixed with liquid isobtuylene coming, via the line 11, from the compressor 9 and the condenser 12. The liquid mixture is introduced into a settling container 13 from which are extracted respectively, through line 14 an aqueous phase containing tertiary butyl alcohol and through line 15 an organic phase containing the isobutylene and the lower polymers of isobutylene.

The tertiary butyl alcohol of line 14 is directed towards an alcohol recovery device which alcohol is then used for the regeneration of the isobutylene by contacting the vapors of tertiary butyl alcohol with sulfuric acid.

The isobutylene of the line 15 is separated from the alcohol and the lower polymers, for instance by distillation.

The process of the invention makes it possible to recover a maximum quantity of the isobutylene contained in the charge.

What is claimed is:

1. In a method for recovering isobutylene contained in vapor form in a charge additionally containing tertiary butyl alcohol, polymers of isobutylene and dilute sulfuric acid, said method comprising the introduction of said charge into a caustic soda scrubbing tower so as to eliminate traces of sulfuric acid and then separating the isobutylene as one product and as a second product a mixture of tertiary butyl alcohol, lower isobutylene polymers, and water, the improvement which comprises recovering the total amount of isobutylene contained in vapor form in the charge by (a) partially condensing the vapors freed of sulfuric acid by sodium hydroxide scrubbing, (b) flash distilling said vapor freed of sulfuric acid as a phase rich in isobutylene, (c) recovering a first liquid phase obtained by said flash distilling, (d) compressing the vapor phase from flash distillation and condensing said vapor phase into a second liquid phase, (e) combining the first and second liquid phases and (f) settling the two liquid phases and recovering an aqueous phase containing tertiary butyl alcohol and an organic phase containing isobutylene, tertiary butyl alcohol and the polymers of isobutylene.

2. In a method of recovering the isobutylene contained in a charge containing primarily isobutylene from the isobutylene regeneration stage in a process for the extraction of isobutylene through the dehydration of tertiary butyl alcohol with a solution of sulfuric acid of a concentration of close to 50%, said method comprising the introduction of said charge into a caustic soda scrubbing tower so as to eliminate traces of sulfuric acid and then separation of isobutylene as a first stream and a mixture of tertiary butyl alcohol, lower isobutylene polymers and water as a second stream and recovering the isobutylene contained in vapor form in said charge the improvement consisting essentially of:

partially condensing the vapors which have been freed of sulfuric acid, said partial condensing being followed by a flash distillation which gives a vapor phase rich in isobutylene and a first liquid phase; compressing the vapor phase and condensing it into a second liquid phase; combining the first and second liquid phases; settling the combined first and second liquid phases; and, recycling into the isobutylene regeneration stage the tertiary butyl alcohol collected as an aqueous phase by said settling of said first and second liquid phases.

References Cited
UNITED STATES PATENTS 3,169,997  2/1965  Baumann et al. ____ 260—677 S

FOREIGN PATENTS 1,270,546  6/1968  Germany _____ 260—677 S

DELBERT E. GANTZ, Primary Examiner

J. M. NELSON, Assistant Examiner

U.S. Cl. X.R.

260—667 S, 643 D